(12) United States Patent
Wang et al.

(10) Patent No.: US 7,782,757 B2
(45) Date of Patent: Aug. 24, 2010

(54) ADAPTIVE PILOT DESIGN FOR MOBILE SYSTEM

(75) Inventors: Lai-Huei Wang, Hsinchu (TW); Pang-An Ting, Hsinchu (TW); Jia-Hao Wu, Hsinchu (TW); Jiun-Yo Lai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 176 days.

(21) Appl. No.: 12/204,422

(22) Filed: Sep. 4, 2008

(65) Prior Publication Data

US 2009/0092194 A1 Apr. 9, 2009

Related U.S. Application Data

(60) Provisional application No. 60/960,557, filed on Oct. 3, 2007.

(51) Int. Cl.
*H04J 11/00* (2006.01)
*H04B 7/185* (2006.01)
*H04W 4/00* (2009.01)
*H03D 1/04* (2006.01)

(52) U.S. Cl. ...................... 370/208; 370/317; 370/332; 370/343; 375/346

(58) Field of Classification Search ......... 370/203–210, 370/310, 315–320, 328–335, 341–344; 375/130, 375/140–148, 346–349; 455/63.1, 114.2, 455/278.1, 296
See application file for complete search history.

(56) References Cited

U.S. PATENT DOCUMENTS 7,548,506 B2 * 6/2009 Ma et al. .................... 370/208

2003/0174643 A1 9/2003 Ro et al.

(Continued)

OTHER PUBLICATIONS

Symbol (data), http://en.wikipedia.orq/wiki/symbol_%28data%29, Feb. 21, 2008.

(Continued)

*Primary Examiner*—Tri H Phan
(74) *Attorney, Agent, or Firm*—Finnegan, Henderson, Farabow, Garrett & Dunner, LLP (57) ABSTRACT

A method, and device implementing the method, for adaptively allocating pilot signals in a wireless communication system. The method includes receiving channel data, including channel length (L) data, inter-carrier interference power ($P_{ICI}$) data, coherence time (CT) data, and a number of subcarriers (N). The method further includes selecting, when L is greater than a first channel length threshold ($L_{TH1}$), a first number of pilot signals between a minimum value of L and a maximum number of pilot signals $N_{P,MAX}$, wherein the first number of pilot signals $N_P$ are equally spaced in time according to the CT data, and equally spaced in frequency. Further, the method includes selecting, when L is less than $L_{TH1}$ and $P_{ICI}$ is less than a power threshold ($P_{TH}$), a second number of pilot signals such that the second number of pilot signals is between the minimum value of L and $N_{P,MAX}$, wherein the second number of pilot signals are equally spaced in time according to the CT data, and equally spaced in frequency. Finally, the method includes selecting, when L is less than $L_{TH1}$ and $P_{ICI}$ is greater than $P_{TH}$, a third number of pilot signals such that the third number of pilot signals is equal to n times L (nL), wherein n is an integer, the third number of pilot signals being equally spaced in time according to the CT data, and allocated according to a cluster(n) clustered pilot scheme with a cluster size equal to n, the n-sized clusters being clustered in frequency.

19 Claims, 11 Drawing Sheets

U.S. PATENT DOCUMENTS

2005/0147176 A1    7/2005   Yun et al.
2006/0146948 A1    7/2006   Park et al.
2006/0285484 A1   12/2006   Papasakellariou et al.
2007/0104174 A1    5/2007   Nystrom et al.
2007/0116095 A1*   5/2007   Gerlach ................. 375/130
2007/0230324 A1*   10/2007   Li et al. ................. 370/204
2009/0257342 A1*   10/2009   Lin et al. ................ 370/208

OTHER PUBLICATIONS

Wei Zhang et al., "Optimal Training and Pilot Pattern Design for OFDM Systems in Rayleigh Fading", IEEE Transactions on Broadcasting, vol. 52, No. 4, Dec. 2006.

Sinem Coleri et al., "Channel Estimation Techniques Based on Pilot Arrangement in OFDM Systems", IEEE Transactions in Broadcasting, vol. 48, No. 3, Sep. 2002.

* cited by examiner

ADAPTIVE PILOT DESIGN FOR MOBILE SYSTEM

RELATED APPLICATIONS

This application claims the benefit of U.S. Provisional Application No. 60/960,557, filed Oct. 3, 2007, the contents of which are incorporated in their entirety herein by reference.

DESCRIPTION OF THE INVENTION

1. Field of the Invention

The following description relates generally to wireless communications and, more particularly, in a wireless communication environment through adaptive pilot allocation.

2. Background of the Invention

Orthogonal frequency division multiplexing (OFDM) is a method of digital modulation in which a signal is split into several narrowband channels, or sub-carriers, at different frequencies. These sub-carriers typically overlap in frequency, but are designed not to interfere with each other as would be the case with traditional frequency division multiplexing (FDM). In addition, the sub-carriers may be efficiently separated using a Fast Fourier Transform (FFT) algorithm.

Each sub-carrier is modulated with a conventional modulation scheme at a low symbol rate (i.e., rate at which a symbol is transmitted, a symbol being a set of data), maintaining data rates similar to other conventional modulation schemes in the same bandwidth. Thus each data stream is a lower speed data transmission, but the aggregate data transmission speed is high. This method allows for high data-rate transmissions over frequency-selective fading channels.

Because of these advantages, OFDM has received considerable interest in recent years. However, OFDM systems require channel state information (CSI) for data transmission and detection. The inclusion of CSI facilitates performance of OFDM in the presence of frequency-selective fading and interference, and allows for data detection and channel equalization in such systems.

In a mobile system, for example, CSI is usually obtained by multiplexing pilot signals with data at a base station, transmitting the data to a mobile station, and estimating the channel at the mobile station with the aid of the pilot signals. The channel can be estimated as the relation of the received pilot signals to the transmitted pilot signals. The performance of the channel estimate (CE) is dependent on the pattern of the pilot signals.

Conventional use of OFDM has included an equally-spaced pilot signal pattern to optimize performance for one-dimensional channel estimation in a quasi-static channel with regard to a mean square error (MSE) of a least squares (LS) channel estimator. In conventional pilot signal pattern schemes implemented in wireless communication systems utilizing OFDM, pilots signals are allocated onto equally-spaced subcarriers one-by-one as a function of carrier frequency. However, such a conventional pattern scheme does not consider inter-carrier interference (ICI) caused by Doppler spread.

In addition, in a mobile environment, such as a car or a train, the CE at the receiver varies as a function of time. A mobile station moving at a high rate of speed can lead to system impairments. For example, in a communication system in a high speed mobile environment, the Doppler spread can be large and lead to a large amount of ICI. As a result, the ICI can significantly degrade the channel estimate (CE) accuracy. Depending on a Doppler spread in the frequency domain, ICI can cause deterioration in the quality of service (QoS). That is, when a high level of ICI is present in a signal, the signal used to modulate a particular sub-carrier disturbs other sub-carriers.

When ICI is large, the performance of CE may be bounded by the ICI. The pilot signal schemes illustrated and described herein are not only effective to deal with AWGN but also perform a function of ICI cancellation.

SUMMARY OF THE INVENTION

In one aspect, there is provided a method for adaptively allocating pilot signals in a wireless communication system. The method includes receiving channel data, including channel length (L) data, inter-carrier interference power ($P_{ICI}$) data, coherence time (CT) data, and a number of subcarriers (N). The method further includes selecting, when L is greater than a first channel length threshold ($L_{TH1}$), a first number of pilot signals between a minimum value of L and a maximum number of pilot signals $N_{P,MAX}$, wherein the first number of pilot signals $N_P$ are equally spaced in time according to the CT data, and equally spaced in frequency. Further, the method includes selecting, when L is less than $L_{TH1}$ and $P_{ICI}$ is less than a power threshold ($P_{TH}$), a second number of pilot signals such that the second number of pilot signals is between the minimum value of L and $N_{P,MAX}$, wherein the second number of pilot signals are equally spaced in time according to the CT data, and equally spaced in frequency. Finally, the method includes selecting, when L is less than $L_{TH1}$ and $P_{ICI}$ is greater than $P_{TH}$, a third number of pilot signals such that the third number of pilot signals is equal to n times L (nL), wherein n is an integer, the third number of pilot signals being equally spaced in time according to the CT data, and allocated according to a clustered pilot scheme with a cluster size equal to n, the n-sized clusters being clustered in frequency.

It is to be understood that both the foregoing general description and the following detailed description are exemplary and explanatory only and are not restrictive of the invention, as claimed.

The accompanying drawings, which are incorporated in and constitute a part of this specification, illustrate several embodiment(s) of the invention and, together with the description, serve to explain the principles of the invention.

DESCRIPTION OF THE EMBODIMENTS

Figure 1:
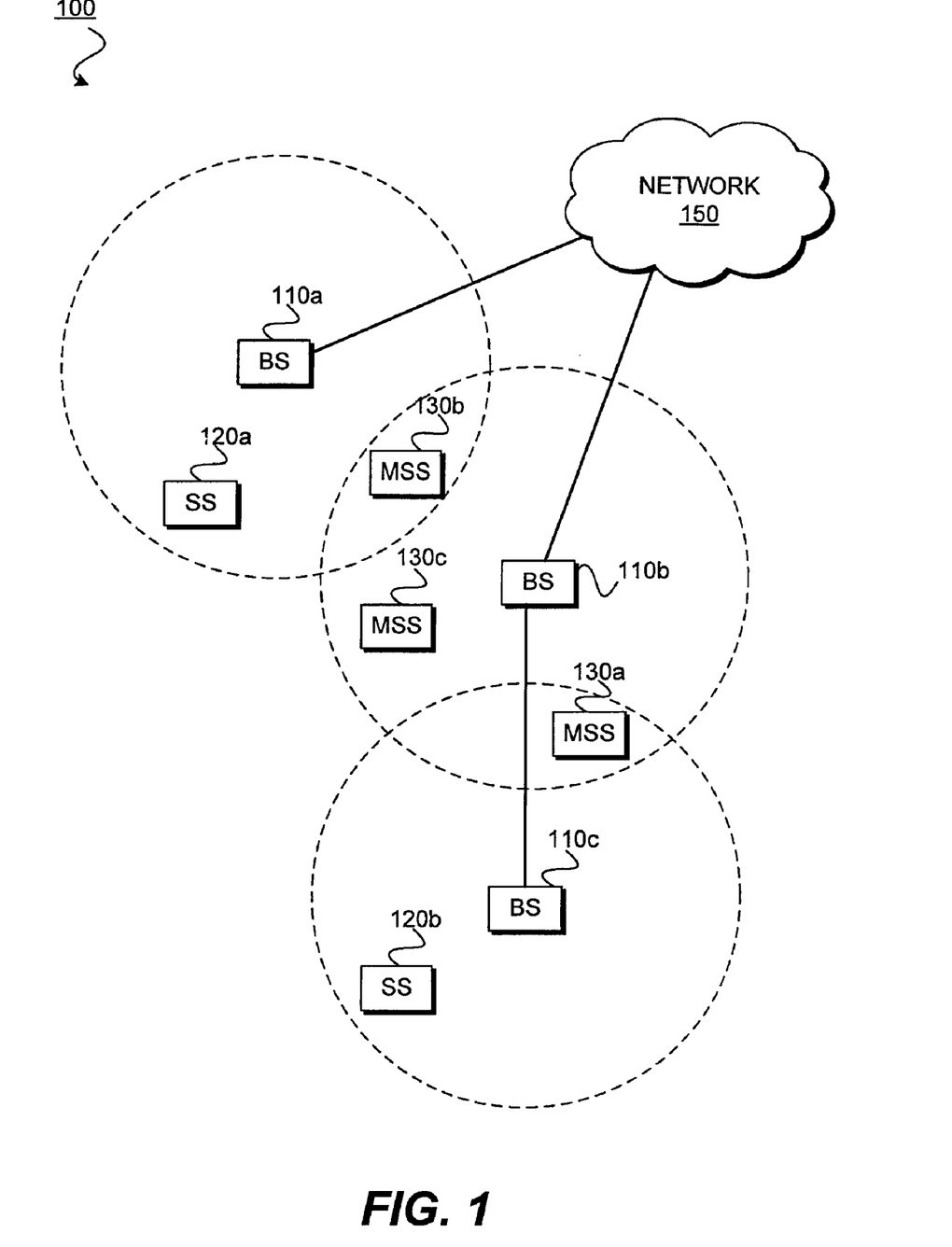
FIG. 1 illustrates an exemplary wireless communication system in which aspects of certain embodiments may be used.

FIG. 1 is a block diagram of an exemplary wireless communication network 100 implementing OFDM, consistent with certain disclosed embodiments. As shown in FIG. 1, wireless communication network 100 may include one or more communication devices, including one or more Base Stations (BS) 110, e.g., BS 110a, BS 110b, and BS 110c, one or more stationary subscriber stations (SS) 120, e.g., SS 120a and SS 120b, and one or more mobile subscriber stations (MSS) 130, e.g., MSS 130a, 130b, and 130c.

BS 110 may be any type of communication device configured to transmit and/or receive data and/or communications based on one or more wireless standards, many of which are known in the art. For example, BS 110 may be configured to communicate with one or more SSs 120, MSSs 130, other BSs 110, and/or other networks 150 using the communication protocols defined by any type of standard including, for example, the Institute of Electrical and Electronics Engineers (IEEE) 802.16 family of standards. In some embodiments, BS 110 may also be referred to as, for example, a Node-B, a base transceiver system (BTS), an access point (AP), etc. In one exemplary embodiment, BS 110 may function as a network coordinator, and may manage the collection, calculation, and communication of data and other network information.

Figure 2A:
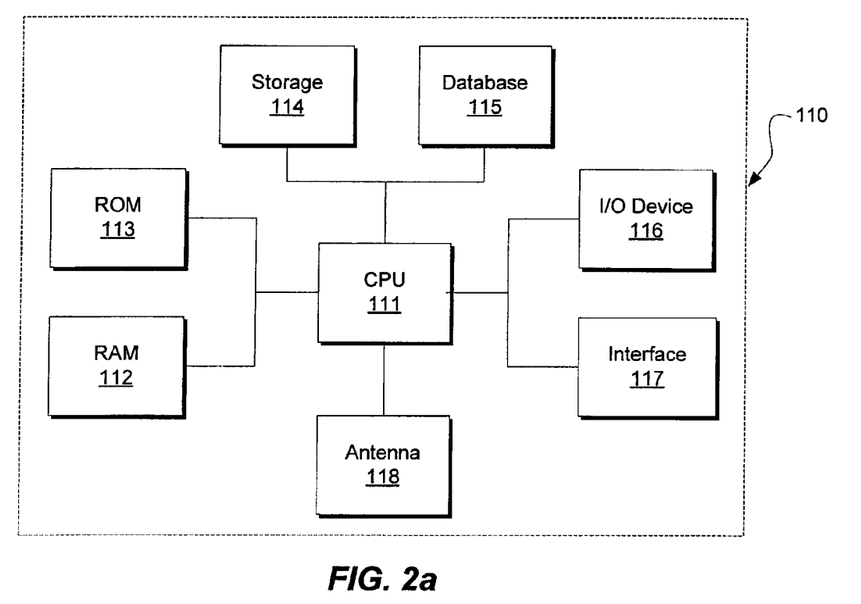
FIG. 2a is a block diagram of an exemplary base station (BS), consistent with certain disclosed embodiments.

FIG. 2a is a block diagram of an exemplary BS 110 that may be used in exemplary wireless communication network 100 implementing OFDM, consistent with certain disclosed embodiments. As shown in FIG. 2a, BS 110 may include one or more of the following components: at least one central processing unit (CPU) 111 configured to execute one or more computer program instructions to perform various processes and methods, random access memory (RAM) 112 and read only memory (ROM) 113 configured to access and store information and computer program instructions, memory 114 to store data and information, one or more databases 115 to store tables, lists, or other data structures, one or more I/O devices 116, one or more interfaces 117, one or more antennas 118, etc. Each of these components is well-known in the art and will not be discussed further.

SS 120 may be any type of communication device configured to transmit and/or receive data and/or communications to and/or from one or more MSSs 130, other SSs 120, and/or BSs 110 using the communication protocols defined by one or more wireless standards including, for example, the IEEE 802.16 family of standards. SSs 120 may include, for example, servers, clients, mainframes, desktop computers, laptop computers, network computers, workstations, personal digital assistants (PDA), tablet PCs, scanners, telephony devices, pagers, cameras, musical devices, etc.

Figure 2B:
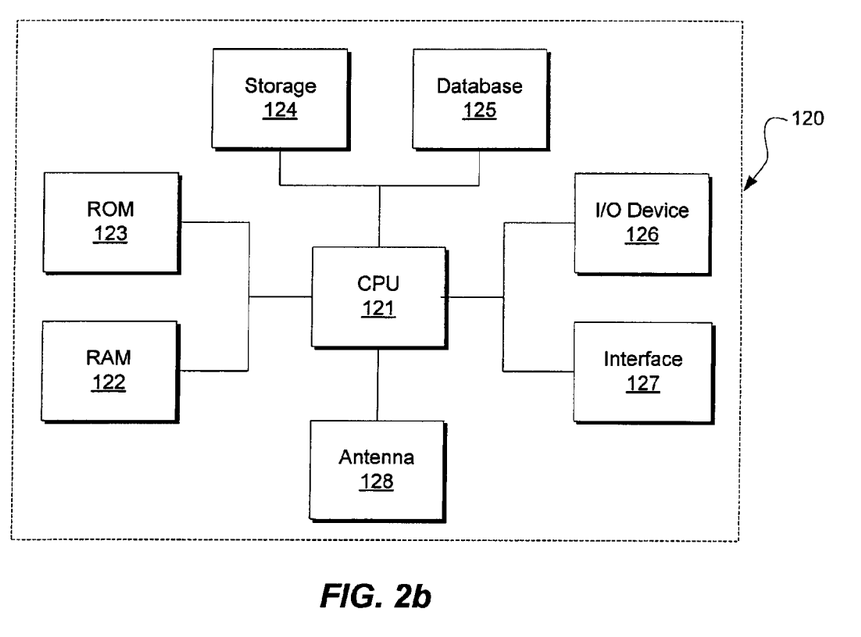
FIG. 2b is a block diagram of an exemplary subscriber station (SS), consistent with certain disclosed embodiments.

FIG. 2b is block diagram of an exemplary SS 120 that may be used in exemplary wireless communication network 100 implementing OFDM, consistent with certain disclosed embodiments. As shown in FIG. 2b, SS 120 may include one or more of the following components: at least one central processing unit (CPU) 121 configured to execute one or more computer program instructions to perform various processes and methods, random access memory (RAM) 122 and read only memory (ROM) 123 configured to access and store information and computer program instructions, memory 124 to store data and information, one or more databases 125 to store tables, lists, or other data structures, one or more I/O devices 126, one or more interfaces 127, one or more antennas 128, etc. Each of these components is well-known in the art and will not be discussed further.

MSS 130 may include any type of wireless client device configured to communicate with BSs 110, SSs 120, and/or other MSSs 130 using one or more wireless communication standards including, for example, the IEEE 802.16 family of standards. MSSs 130 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, MSS 130 may be a mobile computing device. In other embodiments, MSS 130 may be a "non-mobile" computing device located in a mobile environment (e.g., airplanes, watercraft, buses, multi-passenger vehicles, automobiles, etc.).

Figure 2C:
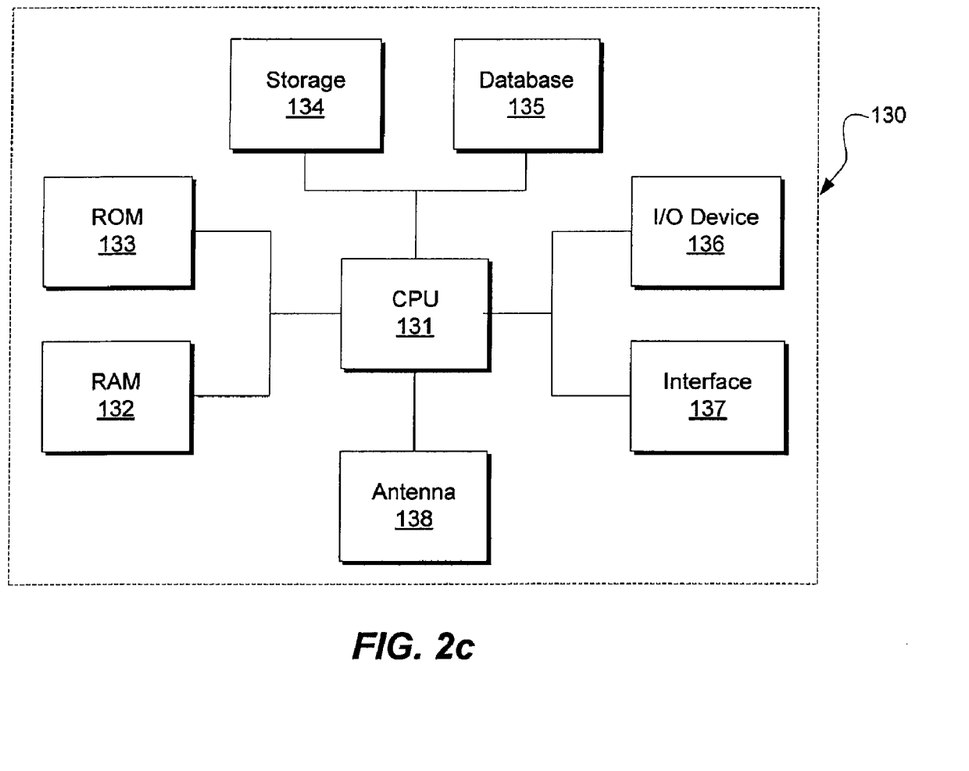
FIG. 2c is a block diagram of an exemplary mobile subscriber station (MSS), consistent with certain disclosed embodiments.

FIG. 2c is a block diagram of an exemplary MSS 130 that may be used in exemplary wireless communication network 100 implementing OFDM, consistent with certain disclosed embodiments. As shown in FIG. 2c, MSS 130 may include one or more of the following components: at least one central processing unit (CPU) 131 configured to execute one or more computer program instructions to perform various processes and methods, random access memory (RAM) 132 and read only memory (ROM) 133 configured to access and store information and computer program instructions, memory 134 to store data and information, one or more databases 135 to store tables, lists, or other data structures, one or more I/O devices 136, one or more interfaces 137, one or more antennas 138, etc. Each of these components is well-known in the art and will not be discussed further.

In one exemplary embodiment, BS 110 may serve as an intermediary between one or more SSs 120, MSSs 130, or BSs 110 and a network 150. Network 150 may be wired, wireless, or any combination thereof. Network 150 may include, for example, any combination of one or more WANs, LANs, intranets, extranets, Internet, etc.

Each BS 110 may have a broadcast range within which that BS 110 may communicate with one or more SSs 120, MSSs 130, and/or other BSs 110. Similarly, each SS 120 and MSS 130 may have broadcast ranges within which that SS 120 and MSS 130 may communicate with one or more other SSs 120, MSSs 130 and/or BSs 110. Broadcast ranges may vary due to power levels, location, interference (physical, electrical, etc.). As used herein, each of BSs 110, SSs 120, and MSSs 130 may be configured to transmit and/or receive data.

In addition to the ability of each BS 110 to connect and communicate with SS 120 and MSS 130, each BS 110 may also connect and communicate with one or more other BSs 110 using a line-of-sight, wireless link. In other words, wireless communication network 100 may provide two forms of wireless communication: a point-to-point (P2P) communication (e.g., between BS 110a and BS 110b) that operates at frequencies up to 66 GHz, and a point-to-multipoint (P2MP) communication (e.g., between BSs 110 and one or more SSs 120 and/or MSSs 130) that operates in the 2.0 to 11.0 GHz range. In one exemplary embodiment, P2MP communication may include so-called Mobile Wi-Max (e.g., communication between BS 110 and one or more MSSs 130). Mobile Wi-Max is based on IEEE 802.16e-1005 and may operate in the 2.3 GHz, 2.5 GHz, 3.3 GHz, and 3.4-3.8 GHz spectrum bands.

Figure 3A:
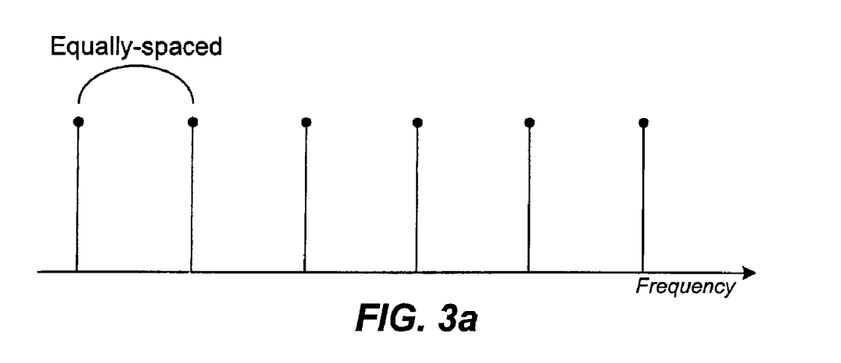
FIG. 3a illustrates exemplary pilot signal locations, consistent with certain disclosed embodiments.
Figure 3B:
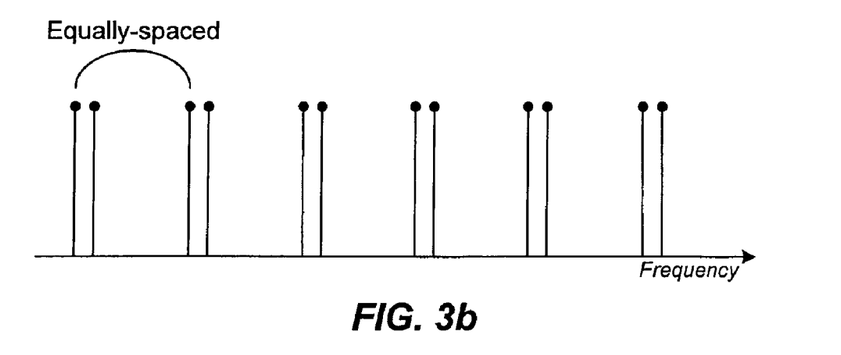
FIG. 3b illustrates exemplary pilot signal locations in a clustered scheme, consistent with certain disclosed embodiments.
Figure 3C:
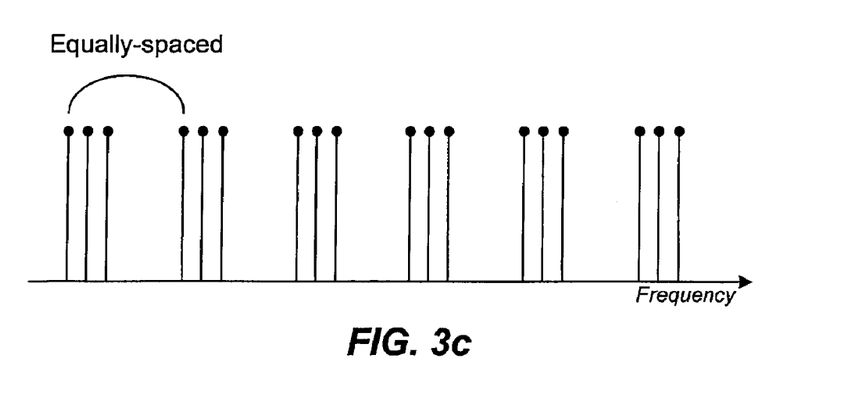
FIG. 3c illustrates exemplary pilot signal locations in a clustered scheme, consistent with certain disclosed embodiments.

FIG. 3a is an exemplary one-dimensional illustration of pilot signal locations in an implementation in which each pilot signal is equidistant from the next pilot signal along the frequency-axis. FIG. 3b is an exemplary one-dimensional illustration of pilot signal locations in a clustered scheme having a cluster of 2 pilot signals (i.e., cluster(2)), consistent with certain disclosed embodiments. Generically, cluster(n) is a cluster that comprises n number of pilot signals, allocated to n number of adjacent sub-carriers, where the clusters are equally spaced from one another. For example, as shown in FIG. 3b, a cluster(2) pilot signal pattern groups 2 individual pilot signals into one cluster, modulates each cluster onto adjacent subcarriers, and equally spaces the clusters. As another example, FIG. 3c is an exemplary one-dimensional illustration of pilot signal locations in a clustered scheme having a cluster of 3 pilot signals (i.e., cluster(3)), consistent with certain disclosed embodiments. As shown in FIG. 3c, a cluster(3) pilot signal pattern scheme groups 3 pilot signals into one cluster, modulates each cluster onto adjacent subcarriers, and equally spaces the clusters. Although not shown, different numbers of pilot signals may be grouped into a single cluster of a set of clusters in a manner similar to that discussed in connection with FIGS. 3b and 3c. FIGS. 3a, 3b, and 3c may be used in exemplary wireless communication network 100 implementing OFDM.

If the cluster(n) pilot pattern schemes are appropriately designed, the ICI due to relative movement of the base station, subscriber stations, and mobile subscriber stations, e.g., BSs 110, SSs 120, and MSS 130, may be self-cancelled and performance would be improved significantly. In one exemplary embodiment, in order for the cluster(n) pilot scheme to effect ICI cancellation, the number of pilot signals should be at least n times the channel length L. In another exemplary embodiment, if the phase difference θ of pilot signals is appropriately selected, ICI terms do not need to be cancelled by computational operations. Instead, the ICI may be self-cancelled. In some embodiments, phase difference selection for CE performance may be a function of the channel length L and the cluster size n.

Figure 4:
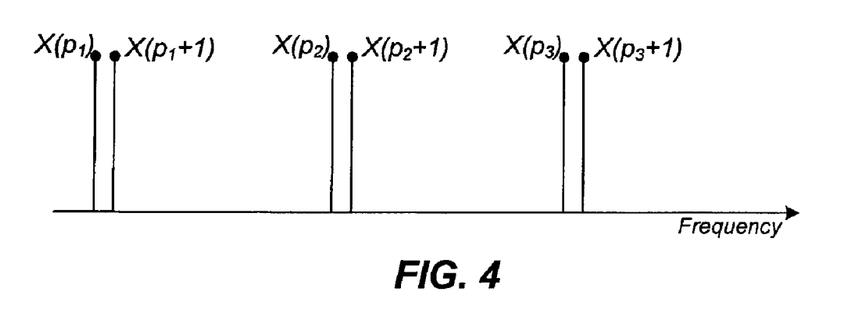
FIG. 4 illustrates an exemplary phase difference of adjacent pilot signals, consistent with certain disclosed embodiments.

FIG. 4 illustrates an exemplary method of phase difference θ selection of adjacent pilot signals, consistent with certain disclosed embodiments. The method of FIG. 4 may be used in exemplary wireless communication network 100 implementing OFDM. As shown in FIG. 4, the phase difference between adjacent pilot signals within every cluster(2) is θ, and is defined by the following equation:

$$\text{phase}\left\{\frac{X(p_k+1)}{X(p_k)}\right\} = \theta, \qquad \text{Eq. 1}$$

wherein:

X ($p_k$) is the pilot on the subcarrier; of index $p_k$ $p_k$ is the subcarrier index of the kth pilot and k is an integer.

The value of θ is selected to reduce the channel impulse response (CIR) mean square error (MSE). To achieve better selection of θ for ICI self-cancellation, θ is selected such that it is close to π if the channel length is smaller than the number of subcarriers (i.e., FFT size). This can be illustrated using the following equation:

$$MSE = \gamma[1 + 0.6\cos\left(\frac{\pi}{N/L} - \theta\right) - 0.3\cos\left(\frac{\pi}{N/L} - 2\theta\right)], \qquad \text{Eq. 2}$$

wherein:

MSE is Mean Square Error;

γ is a function of the normalized Doppler spread independent of θ.

π has units of radians;

N is FFT size;

L is channel length; and

θ is phase difference.

The ICI of data close to pilot clusters will be partially cancelled due to ICI self-cancellation. Therefore, data close to pilot signal clusters can be modulated using different modulation and coding schemes according to system conditions. In one exemplary embodiment, the closer the data is to a pilot signal cluster, the greater the modulation. In a quasi-static channel, i.e., a channel which is assumed unchanged within the period of one OFDM symbol, there may be no ICI caused by Doppler spread. Therefore, the performances of CE may be the same in a conventional system as in a cluster(n) scheme if the number of pilot signals is at least n times the channel length. However, in a mobile channel, considering the ICI effect, cluster(n) schemes provide ICI cancellation ability, while conventional schemes do not.

Table 1 below lists simulation parameters which are similar to those in the Institute of Electrical and Electronics Engineers (IEEE) 802.16 family of standards. To demonstrate the systems and methods consistent with the present invention, the simulation parameters of Table 1 will be used.

TABLE 1

Exemplary Simulation Parameters

| | |
|---|---|
| Carrier Frequency | 2.5 GHz |
| Subcarrier Spacing | 10.94 kHz |
| Channel Model | ITU-VA + Jakes |
| FFT Size | 1024 |
| Guard Interval | 1024/8 = 128 |
| RX Speed | 100, 200, 300 km/hr |
| Channel Length of RX | 64 |
| Pilot Number | 2 * 64 = 128 (integer value) |
| Pilot Power Boosting | No |
| AWGN | No |
| Guard Band | No |
| Channel Estimation Performance Indicator | Mean Square Error (MSE) of Channel Impulse Response (CIR) (dB) |

Figure 5:
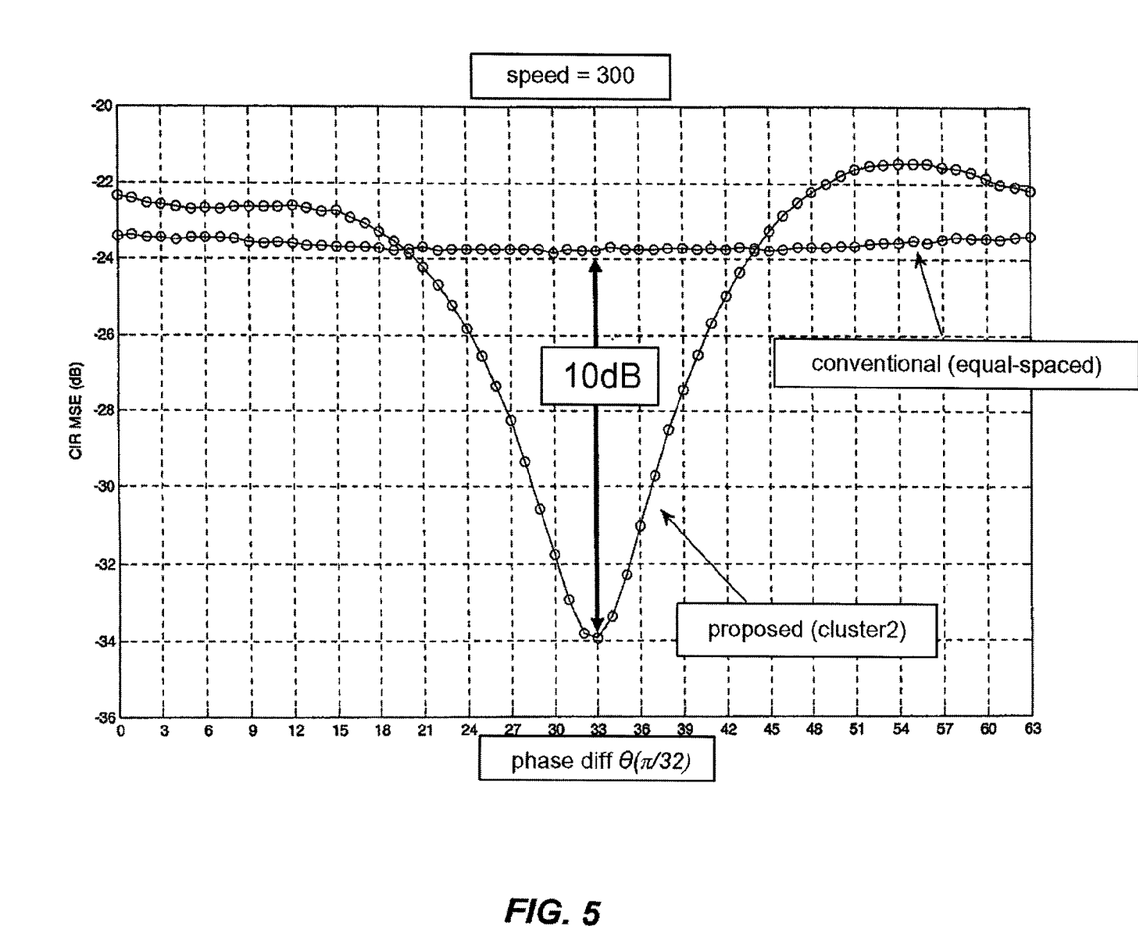
FIG. 5 is an exemplary graphical representation of the performance of a pilot signal pattern scheme, consistent with certain disclosed embodiments.

FIG. 5 is an exemplary graphical representation of a performance comparison between a scheme utilizing equally spaced pilot signals and a cluster(2) pilot pattern scheme such as may be used in an OFDM wireless communication system, consistent with certain disclosed embodiments. In FIG. 5, the assumptions includes the conditions listed in Table 1 with RX speed=300 km/hr. The x-axis of the exemplary graphical representation is the phase difference θ of adjacent pilot signals within every cluster in units of π/32, and the y-axis is the CIR MSE measured in dB. As shown in FIG. 5, the performance of the conventional scheme is substantially unaffected by the phase difference θ, and the MSE is roughly equal to −23.5 dB. In contrast, the performance of the cluster(2) scheme is sensitive to the phase difference θ. This is because, if the phase difference is set appropriately, the ICI may be self-cancelled. If the phase difference is not set appropriately, it may cause the ICI to worsen. In FIG. 5, better performance occurs when the phase difference is equal to π*33/32 and the MSE is roughly equal to −34 dB. Thus, the simulation illustrated by exemplary FIG. 5 demonstrates that the MSE CIR performance of the cluster(2) scheme is better than the conventional scheme by about 10 dB.

Figure 6:
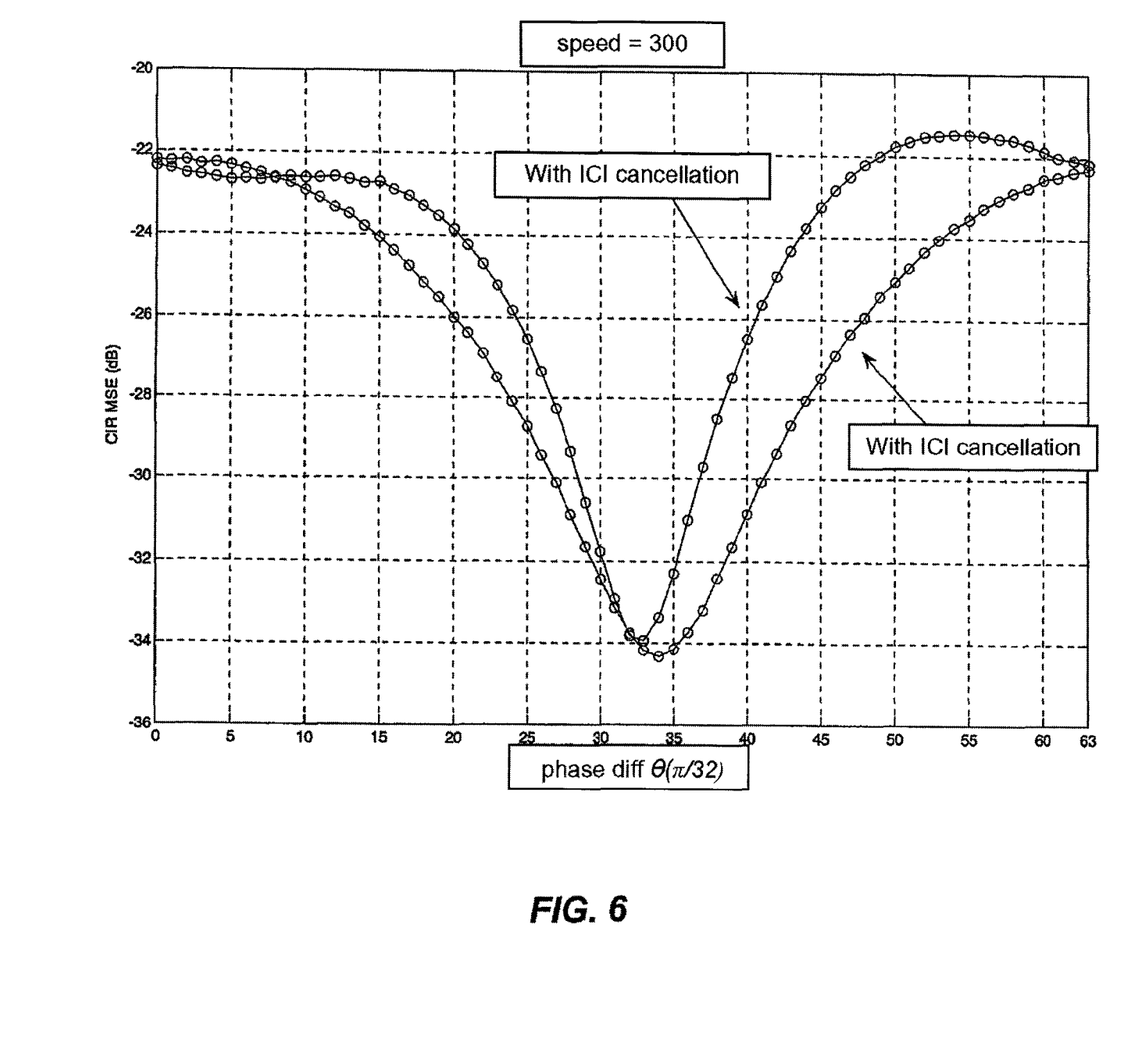
FIG. 6 is an exemplary graphical representation of the performance of a pilot signal pattern scheme, consistent with certain disclosed embodiments.

FIG. 6 is an exemplary graphical representation of the same performance comparison as in FIG. 5 except that the ICI is not self-cancelled, but is instead cancelled by additional cancellation hardware in the MSS. The results of the two cancellation schemes, respectively shown in FIGS. 5 and 6, are almost the same, demonstrating that, if the clustered pilot signal pattern is designed properly, extra computational complexity is not needed for ICI cancellation of CE.

Figure 7:
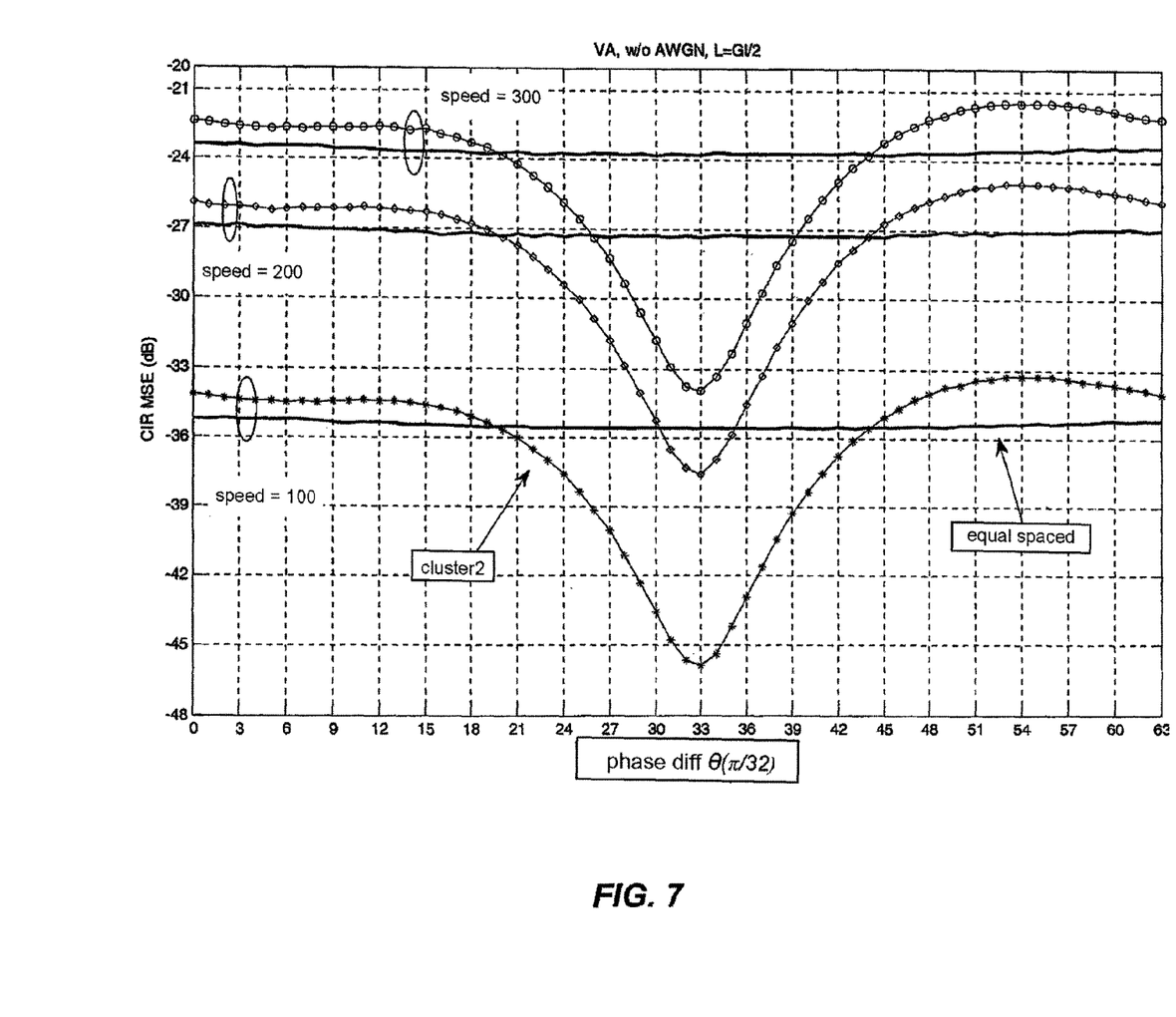
FIG. 7 is an exemplary graphical representation of the performance of a pilot signal pattern scheme, consistent with certain disclosed embodiments.

FIG. 7 is an exemplary graphical representation of a performance comparison between a scheme utilizing equally spaced pilot signals and a cluster(2) pilot pattern scheme such as may be used in an OFDM wireless communication system, consistent with certain disclosed embodiments. In FIG. 7, the assumptions includes the conditions listed in Table 1 with RX speed=300 km/hr, RX speed=200 km/hr, and RX speed=100 km/hr. As shown in FIG. 7, the 10 dB MSE CIR performance improvement is not reduced as the speed decreases.

Figure 8:
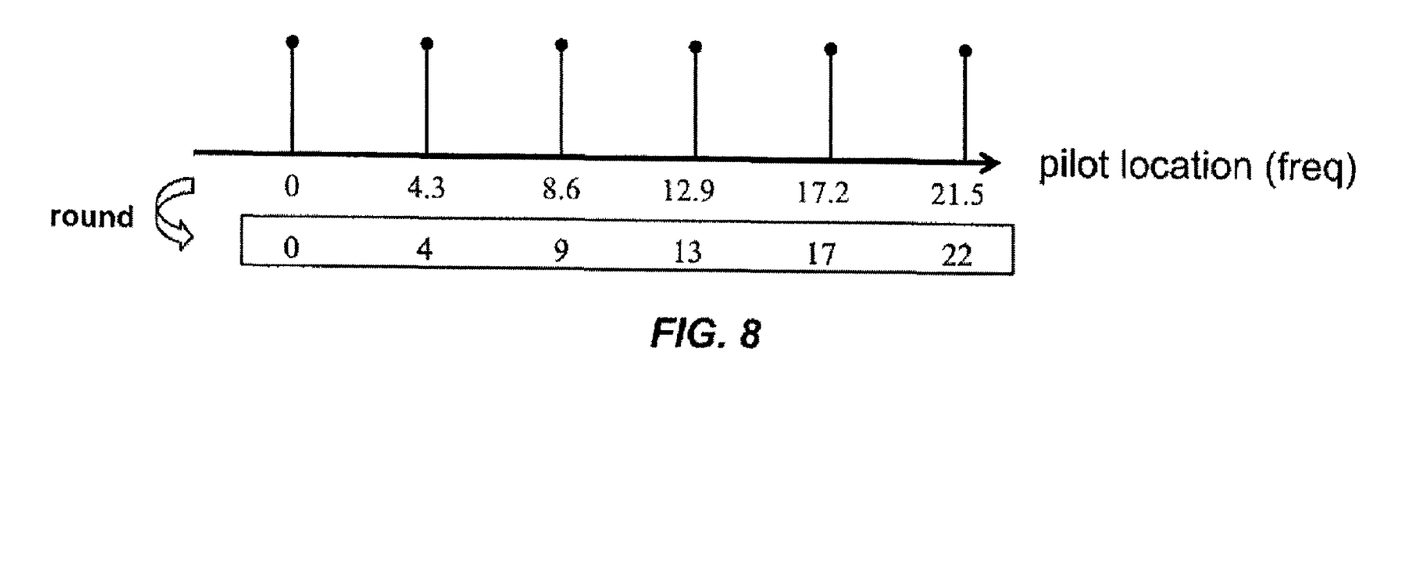
FIG. 8 illustrates phase differences in a rounding scheme, consistent with certain disclosed embodiments.

FIG. 8 provides an exemplary illustration of pilot signal locations in frequency for equal-spaced pilot signal pattern schemes when the pilot number $N_p$ is selected as a minimum pilot number such as may be used in an OFDM wireless communication system, consistent with certain disclosed embodiments. Here, a spacing Δk between two pilot signal frequencies is N/L (i.e., FFT size/number of pilot signals). If the result of N/L is an integer, the scheme may have better performance. However, if N/L is not an integer, the determination of pilot signal spacing can significantly affect performance. In this illustration, for example, N/L is not an integer, and pilot locations are selected by rounding off the pilot signal location frequency determined by spacing Δk to a nearest integer. As shown in FIG. 8, when Δk=4.3, the second pilot signal location frequency is rounded from 4.3 to 4. Similarly, pilot signal locations at pilot signal location frequencies determined by spacing Δk to be 8.6, 12.9, 17.2, and 21.5 are rounded to normalized subcarrier spacing values of 8, 13, 17, and 22, respectively.

In an exemplary embodiment in which a maximum number of pilot signals $N_{P,MAX}$ is set, the pilot signal number $N_P$ and location of pilot signals are adapted to the channel length L and ICI power ($P_{ICI}$) on the receiving side. With reference to Table 2 below, when L is large or $P_{ICI}$ is small, a pilot signal scheme is chosen having equally spaced pilot signals, and a pilot signal number $N_p$ is chosen from L to $N_{P,MAX}$, based on desired performance results. When L is small and $P_{ICI}$ is large, a pilot signal scheme is chosen having cluster(n) pilot signal location, and a pilot signal number $N_P$ is chosen from nL to $N_{P,MAX}$, based on desired performance results.

TABLE 2

Adaptive Types of Pilot Signal Schemes

| | L is Large Any $P_{ICI}$ | Any L $P_{ICI}$ is Small | L is Small Any $P_{ICI}$ is Large |
|---|---|---|---|
| Pilot Signal Number | L~$N_{P,MAX}$ | L~$N_{P,MAX}$ | nL~$N_{P,MAX}$ |
| Pilot Signal Location | Equal-Spaced | Equal-Spaced | Cluster(n) |

In a quasi-static channel, given a total pilot power constraint, the minimum number of pilots desired to obtain a better CE performance is L. For MSS 130, the channel varies slowly, and interpolation algorithms can be used for CE. In one exemplary embodiment, a given number M total symbols are needed over L total pilot signals in order to maintain better CE performance as long as pilot signals are equally spaced in the time-axis and equally spaced in the frequency axis within each set of M symbols. In addition, the following equation would need to be true:

$$1/M \geq 2f_D(1+r_{CP}), \quad \text{Eq. 3}$$

wherein:

M is the number of symbols;

$f_D$ is the normalized Doppler spread; and $r_{CP}$ is the ratio of a guard interval length to FFT size, where the guard interval is the Cyclic Prefix (CP) used to prevent the effect of inter-symbol interference (ISI) in OFDM systems.

Figure 9A:
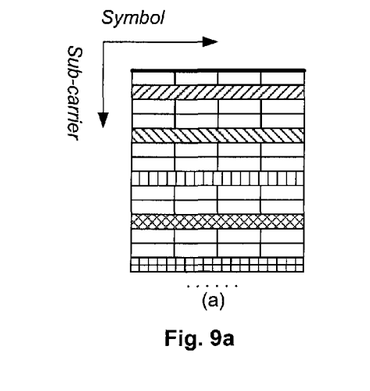
FIG. 9a is an exemplary two-dimensional illustration of pilot signal locations as a function of symbol and sub-carrier, consistent with certain disclosed embodiments.
Figure 9B:
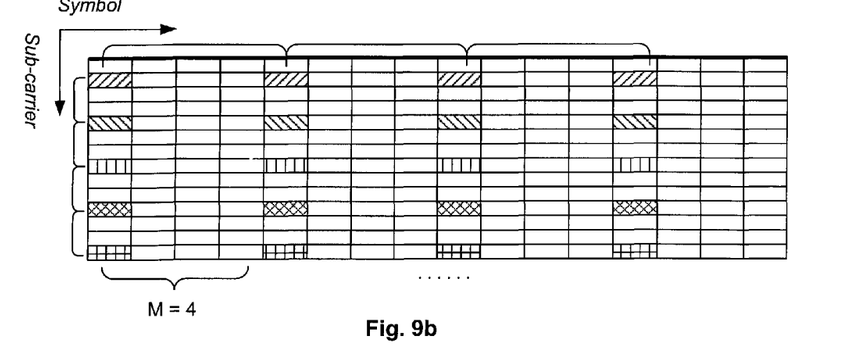
FIG. 9b is an exemplary two-dimensional illustration of pilot signal locations as a function of symbol and sub-carrier, consistent with certain disclosed embodiment.
Figure 9C:
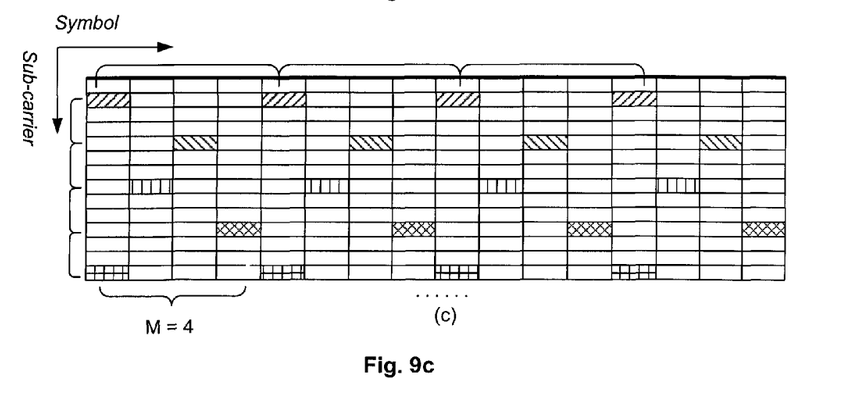
FIG. 9c is an exemplary two-dimensional illustration of pilot signal locations as a function of symbol and sub-carrier, consistent with certain disclosed embodiments.

FIGS. 9a, 9b, and 9c each illustrate an exemplary two-dimensional illustration of pilot signal locations as a function of symbol and sub-carrier such as may be used in an OFDM wireless communication system, consistent with certain disclosed embodiments. The different type of crosshatchings used in the block representations of FIG. 9a-9c illustrate discrete user or transmitter pilots. FIG. 9a discloses an embodiment in which the pilot signals are equally spaced along the frequency and time domains. In this configuration, a discrete user or transmitter pilot is assigned to each subcarrier.

FIG. 9b illustrates a cluster(n) embodiment in which the clusters of pilot signals are equally spaced along the frequency domain within a number of symbols M. As in FIG. 9a, a discrete user or subcarrier pilot is assigned a specific subcarrier and the subcarriers are equally spaced. In this configuration, pilots are equally spaced along the time domain at a distance of M symbols.

FIG. 9c discloses a cluster(n) embodiment in which, as in FIG. 9b, the clusters of pilot signals are equally spaced along the time domain within a number of symbols M. In FIGS. 9b and 9c, the number of symbols M is equal to 4. In both FIGS. 9b and 9c the first four symbols, labeled "M=4", are pilot symbols used to estimate the received channel.

Figure 10:
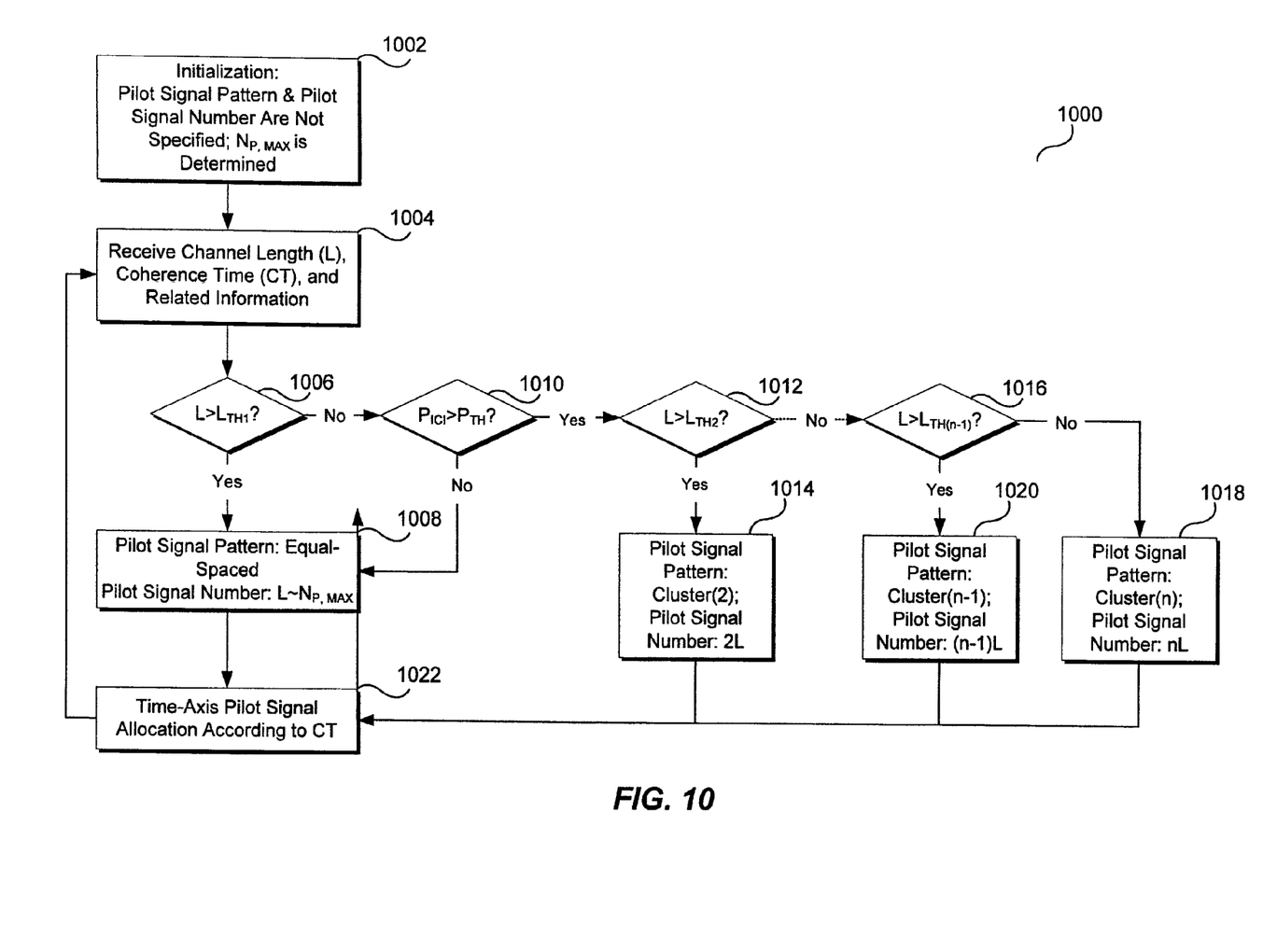
FIG. 10 is an exemplary flow chart illustrating a method, consistent with certain disclosed embodiments.

FIG. 10 is an exemplary flow chart of a method 1000 for adaptively allocating pilot signals such as may be used in an OFDM wireless communication system, consistent with certain disclosed embodiments. More particularly, in view of the various pilot schemes described above, which may be adapted to different conditions encountered in a wireless communication system, method 1000 adapts an appropriate pilot signal pattern scheme based on the encountered conditions. Method 1000 commences with initialization, in which the pilot signal pattern scheme and number of pilot signals are unrestricted (step 1002). In step 1002, the maximum number of pilots $N_{P,MAX}$ is determined by the system requirement or, if applicable, an industry standard. An example of a system requirement could include a requested peak system throughput. A system throughput refers to the amount of data transferred through a system in a specific amount of time. The total number of pilots in a system may be constrained to enable the requested peak throughput. That is, in order to maintain a peak system throughput, there would be maximum number of the total symbols which can be allocated as pilot symbols, which corresponds to the maximum number of pilots $N_{P,MAX}$.

When MSS 130 receives a signal, it detects parameters of the message. For example, MSS 130 receives a signal and detects a channel length L, ICI power $P_{ICI}$, channel coherence time CT, and/or other parameters related to these parameters. These parameters are fed back to the BS 110 (step 1004).

In another exemplary embodiment, BS 110 may be adapted to detect one or more of these parameters (e.g., L, $P_{ICI}$, CT, etc.). For example, after receipt or acquisition of one or more of these parameters (e.g., L, $P_{ICI}$, CT, etc.), BS 110 may determine if L is greater than a first channel length threshold $L_{TH1}$ (step 1006). When L is greater than $L_{TH1}$, the pilot signal pattern scheme is set such that the pilot signals are equally-spaced, and the pilot number $N_P$ can be chosen from L to $N_{P,MAX}$ (step 1008). When L is less than or equal to $L_{TH1}$, BS 110 may determine whether $P_{ICI}$ is greater than a power threshold $P_{TH}$ (step 1010). When $P_{ICI}$ is less than or equal to $P_{TH}$, the pilot signal pattern scheme is set to provide equally-spaced pilot signals, and the pilot signal number $N_P$ is chosen from L to $N_{P,MAX}$ (1008). When $P_{ICI}$ is greater than $P_{TH}$, BS 110 may also determine if L is greater than a second channel length threshold $L_{TH2}$ (step 1012). When L is less than or equal to the second channel length threshold $L_{TH2}$, a pilot signal pattern cluster(2) is selected, and the pilot signal number $N_P$ is set to 2 L (step 1014). When L is greater than $L_{TH2}$, BS 110 may further determine, in turn, whether L is greater than channel length thresholds of $L_{TH2}$, $L_{TH3}$ ..., and $L_{TH(n-1)}$ to determine pilot signal cluster size. This continues until a cluster(n−1) is selected (step 1016) or a maximum pilot signal cluster size cluster(n) is reached (step 1018). If L is determined to be less than or equal to $L_{TH(n-1)}$ (1016), a pilot signal pattern cluster(n−1) is selected, and the pilot signal number $N_P$ is set to (n−1)L (step 1020). If L is determined to be greater than $L_{TH(n-1)}$ (step 1018), a pilot signal pattern cluster(n) is selected and the pilot signal number $N_P$ is set to nL. After the pilot pattern is selected in one of steps 1008, 1014, 1018, 1020, the pilot signals are allocated on the time axis according to the coherence time (CT). The method then returns to step 1004 to receive the next set of channel parameters.

The threshold parameters for length and power are set according to system performance requirements. After selecting the pilot scheme, the base stations, e.g., BS 110, would then decide the pilot density along the time axis according to the channel coherence bandwidth. If the coherence bandwidth is small, the time-axis pilot signal pattern density is set to have a greater density. Otherwise, the pilot signal pattern density is set to a lower density.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for adaptively allocating pilot signals in a wireless communication system, the method comprising:
   receiving, by a receiving unit, channel data, including channel length (L) data and coherence time (CT) data, and inter-carrier interference power ($P_{ICI}$) data;
   selecting, by a selecting unit, when L is greater than a first channel length threshold ($L_{TH1}$), a first number of pilot signals between a minimum value of L and a maximum number of pilot signals $N_{P,MAX}$, wherein the first number of pilot signals $N_P$ are equally spaced in time according to the CT data, and equally spaced in frequency;
   selecting, by the selecting unit, when L is less than $L_{TH1}$ and $P_{ICI}$ is less than a power threshold ($P_{TH}$), a second number of pilot signals such that the second number of pilot signals is between the minimum value of L and $N_{P,MAX}$, wherein the second number of pilot signals are equally spaced in time according to the CT data, and equally spaced in frequency; and
   selecting, by the selecting unit, when L is less than $L_{TH1}$ and $P_{ICI}$ is greater than $P_{TH}$, a third number of pilot signals such that the third number of pilot signals is equal to n times L (nL), wherein n is an integer, the third number of pilot signals being equally spaced in time according to the CT data, and allocated according to a cluster (n) clustered pilot scheme with a cluster size equal to n, the n-sized clusters being clustered in frequency.

2. The method of claim 1 further comprising, when the third number of pilot signals are clustered according to a clustered pilot scheme and when L is greater than a second channel length threshold $L_{TH2}$, allocating the pilot signals according to a cluster(2) clustered pilot scheme, wherein the cluster size n is equal to 2 and the third number of pilot signals is at least 2 L.

3. The method of claim 1, when the third number of pilot signals are clustered according to the clustered pilot scheme and when L is greater than a third channel length threshold $L_{TH3}$, allocating the pilot signals according to a cluster(3) clustered pilot scheme, wherein the cluster size n is equal to 3 and the third number of pilot signals is at least 3 L.

4. The method of claim 1, further comprising:
   receiving further channel data including a number of subcarriers (N);
   determining, when the first number of pilot signals are equally spaced in frequency and N is a minimal value, if N/L is an integer value;
   determining a frequency spacing Δk between the equally spaced pilot signals is equal to N/L when N/L is an integer value;
   allocating each pilot signal when Δk is equal to $N/L_R$ when N/L is not an integer value, by rounding the frequency of the pilot signal determined by Δk to a nearest integer value.

5. The method of claim 1, wherein the pilot signal allocation according to a clustered pilot scheme is performed by modulating the pilot signal cluster onto one or more adjacent subcarriers.

6. The method of claim 5, wherein the modulation is orthogonal frequency division multiplexing (OFDM).

7. The method of claim 1, wherein the phase difference between adjacent pilot signals in a pilot signal cluster is θ (when n=2).

8. The method of claim 7, further comprising:
   determining, the value of θ is set to π (when n=2).

9. A non-transitory computer readable medium containing instructions executable by a processor to perform the method of claim 1.

10. A communication device in a wireless communication system, the communication device comprising:
    a receiving unit configured to receive channel data, including channel length (L) data and coherence time (CT) data, and inter-carrier interference power ($P_{ICI}$) data;

a selecting unit configured to select, when L is greater than a first channel length threshold ($L_{TH1}$), a first number of pilot signals between a minimum value of L and a maximum number of pilot signals $N_{P,MAX}$, wherein the first number of pilot signals $N_P$ are equally spaced in time according to the CT data, and equally spaced in frequency;

the selecting unit further configured to select, when L is less than $L_{TH1}$ and $P_{ICI}$ is less than a power threshold ($P_{TH}$), a second number of pilot signals such that the second number of pilot signals is between the minimum value of L and $N_{P,MAX}$, wherein the second number of pilot signals are equally spaced in time according to the CT data, and equally spaced in frequency; and the selecting unit further configured to select, when L is less than $L_{TH1}$ and $P_{ICI}$ is greater than $P_{TH}$, a third number of pilot signals such that the third number of pilot signals is equal to n times L (nL), wherein n is an integer, the third number of pilot signals being equally spaced in time according to the CT data, and allocated according to a cluster (n) clustered pilot scheme with a cluster size equal to n, the n-sized clusters being clustered in frequency.

11. The communication device of claim 10, wherein the third number of pilot signals are clustered according to the clustered pilot scheme and when L is greater than a second channel length threshold $L_{TH2}$, allocating the pilot signals according to a cluster(2) clustered pilot scheme, wherein the cluster size n is equal to 2 and the third number of pilot signals at least 2L.

12. The communication device of claim 10, wherein the number of pilot signals are clustered according to the clustered pilot scheme and when L is greater than a third channel length threshold $L_{TH3}$, allocating the pilot signals according to a cluster(3) clustered pilot scheme, wherein the cluster size n is equal to 3 and the third number of pilot signals is at least 3L.

13. The communication device of claim 10, wherein the receiving unit is further configured to receive channel data including a number of subcarriers (N), the transmission device further comprising:
  a determining unit configured to:
    determine when the first number of pilot signals are equally spaced in frequency and N is a minimal value, if N/L is an integer value;
    determine a frequency spacing Δk between the equally spaced pilot signals is equal to N/L when N/L is an integer value; and
  the pilot allocation unit being configured to allocate each pilot signal when Δk equal to N/L is not an integer value, by rounding the frequency of the pilot signal determined by Δk to a nearest integer value.

14. The communication device of claim 10, wherein the pilots are allocated by modulating the pilots onto adjacent subcarriers.

15. The communication device of claim 14, wherein the modulation is orthogonal frequency division multiplexing (OFDM).

16. The communication device of claim 10, wherein a frequency distance between adjacent pilots in a pilot cluster θ is set to π when channel length L is significantly smaller than a number of subcarriers N.

17. The communication device of claim 10, wherein the communication device is a mobile subscriber station.

18. The communication device of claim 10, wherein the communication device is a base station.

19. The communication device of claim 10, wherein the communication device is a stationary subscriber station.

* * * * *